US006134764A

United States Patent [19]

Rivera

[11] Patent Number: 6,134,764

[45] Date of Patent: Oct. 24, 2000

[54] BRAKE CALIPER RETRACTING TOOL

[76] Inventor: Amaury Rivera, 25790 SW. 124 Ct., Princeton, Fla. 33032

[21] Appl. No.: 09/324,642

[22] Filed: Jun. 3, 1999

[51] Int. Cl.⁷ ........ B23P 19/04

[52] U.S. Cl. ........ 29/239; 29/252

[58] Field of Search ........ 29/239, 252, 238; 254/93 R

[56] References Cited

U.S. PATENT DOCUMENTS 3,081,066 3/1963 Murawski ........ 29/239
3,574,915 4/1971 Jeal ........ 29/252
5,345,985 9/1994 Murphy ........ 29/239

*Primary Examiner*—Robert C. Watson

[57] ABSTRACT

A brake caliper retracting tool for pushing a brake caliper piston into a piston housing to provide space for installing a brake pad in the caliper. The brake caliper retracting tool includes a housing with proximal and distal ends, and an inner surface defining an interior cavity in the housing. An elongate shaft is slidably extended through the distal end of the housing into the interior cavity of the housing to permit slidable extension and retraction of the shaft in and out of the interior cavity of the housing. A plunger is disposed in the interior cavity of the housing and is coupled to a proximal end of the shaft. A backing plate is coupled to the distal end of the housing. A pushing plate is coupled to a distal end of the shaft. A passage extends through the proximal end of the housing and is designed for connecting to an air supply to permit passage therethrough of air into the interior cavity.

20 Claims, 2 Drawing Sheets

BRAKE CALIPER RETRACTING TOOL

BACKGROUND OF THE INVENTION

1. Field of the Invention

The present invention relates to brake caliper retracting tools and more particularly pertains to a new brake caliper retracting tool for pushing a brake caliper piston into a piston housing to provide space for installing a brake pad in the caliper.

2. Description of the Prior Art

The use of brake caliper retracting tools is known in the prior art. More specifically, brake caliper retracting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,678,293; U.S. Pat. No. 4,288,899; U.S. Pat. No. Des. 320,540; U.S. Pat. No. 5,018,261; U.S. Pat. No. 5,269,053; and U.S. Pat. No. 2,421,324 which are all incorporated by reference herein to the extent necessary for purposes of understanding and enabling the present invention.

While these devices fulfill their respective, particular objectives and requirements, the aforementioned patents do not disclose a new brake caliper retracting tool. The inventive device includes a housing with proximal and distal ends, and an inner surface defining an interior cavity in the housing. An elongate shaft is slidably extended through the distal end of the housing into the interior cavity of the housing to permit slidable extension and retraction of the shaft in and out of the interior cavity of the housing. A plunger is disposed in the interior cavity of the housing and is coupled to a proximal end of the shaft. A backing plate is coupled to the distal end of the housing. A pushing plate is coupled to a distal end of the shaft. A passage extends through the proximal end of the housing and is designed for connecting to an air supply to permit passage therethrough of air into the interior cavity.

In these respects, the brake caliper retracting tool according to the present invention substantially departs from the conventional concepts and designs of the prior art, and in so doing provides an apparatus primarily developed for the purpose of pushing a brake caliper piston into a piston housing to provide space for installing a brake pad in the caliper.

SUMMARY OF THE INVENTION

In view of the foregoing disadvantages inherent in the known types of brake caliper retracting tools now present in the prior art, the present invention provides a new brake caliper retracting tool construction wherein the same can be utilized for pushing a brake caliper piston into a piston housing to provide space for installing a brake pad in the caliper.

The general purpose of the present invention, which will be described subsequently in greater detail, is to provide a new brake caliper retracting tool apparatus and method which has many of the advantages of the brake caliper retracting tools mentioned heretofore and many novel features that result in a new brake caliper retracting tool which is not anticipated, rendered obvious, suggested, or even implied by any of the prior art brake caliper retracting tools, either alone or in any combination thereof.

To attain this, the present invention generally comprises a housing with proximal and distal ends, and an inner surface defining an interior cavity in the housing. An elongate shaft is slidably extended through the distal end of the housing into the interior cavity of the housing to permit slidable extension and retraction of the shaft in and out of the interior cavity of the housing. A plunger is disposed in the interior cavity of the housing and is coupled to a proximal end of the shaft. A backing plate is coupled to the distal end of the housing. A pushing plate is coupled to a distal end of the shaft. A passage extends through the proximal end of the housing and is designed for connecting to an air supply to permit passage therethrough of air into the interior cavity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new brake caliper retracting tool apparatus and method which has many of the advantages of the brake caliper retracting tools mentioned heretofore and many novel features that result in a new brake caliper retracting tool which is not anticipated, rendered obvious, suggested, or even implied by any of the prior art brake caliper retracting tools, either alone or in any combination thereof.

It is another object of the present invention to provide a new brake caliper retracting tool which may be easily and efficiently manufactured and marketed.

It is a further object of the present invention to provide a new brake caliper retracting tool which is of a durable and reliable construction.

An even further object of the present invention is to provide a new brake caliper retracting tool which is susceptible of a low cost of manufacture with regard to both materials and labor, and which accordingly is then susceptible of low prices of sale to the consuming public, thereby making such brake caliper retracting tool economically available to the buying public.

Still yet another object of the present invention is to provide a new brake caliper retracting tool which provides in the apparatuses and methods of the prior art some of the advantages thereof, while simultaneously overcoming some of the disadvantages normally associated therewith.

Still another object of the present invention is to provide a new brake caliper retracting tool for pushing a brake caliper piston into a piston housing to provide space for installing a brake pad in the caliper.

Yet another object of the present invention is to provide a new brake caliper retracting tool which includes a housing with proximal and distal ends, and an inner surface defining an interior cavity in the housing. An elongate shaft is slidably extended through the distal end of the housing into the interior cavity of the housing to permit slidable extension and retraction of the shaft in and out of the interior cavity of the housing. A plunger is disposed in the interior cavity of the housing and is coupled to a proximal end of the shaft. A backing plate is coupled to the distal end of the housing. A pushing plate is coupled to a distal end of the shaft. A passage extends through the proximal end of the housing and is designed for connecting to an air supply to permit passage therethrough of air into the interior cavity.

Still yet another object of the present invention is to provide a new brake caliper retracting tool that is connectable to an air supply such as a compressed air supply to push the caliper piston into the piston housing to widen the brake space in the caliper to permit installation of a brake pad into the caliper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
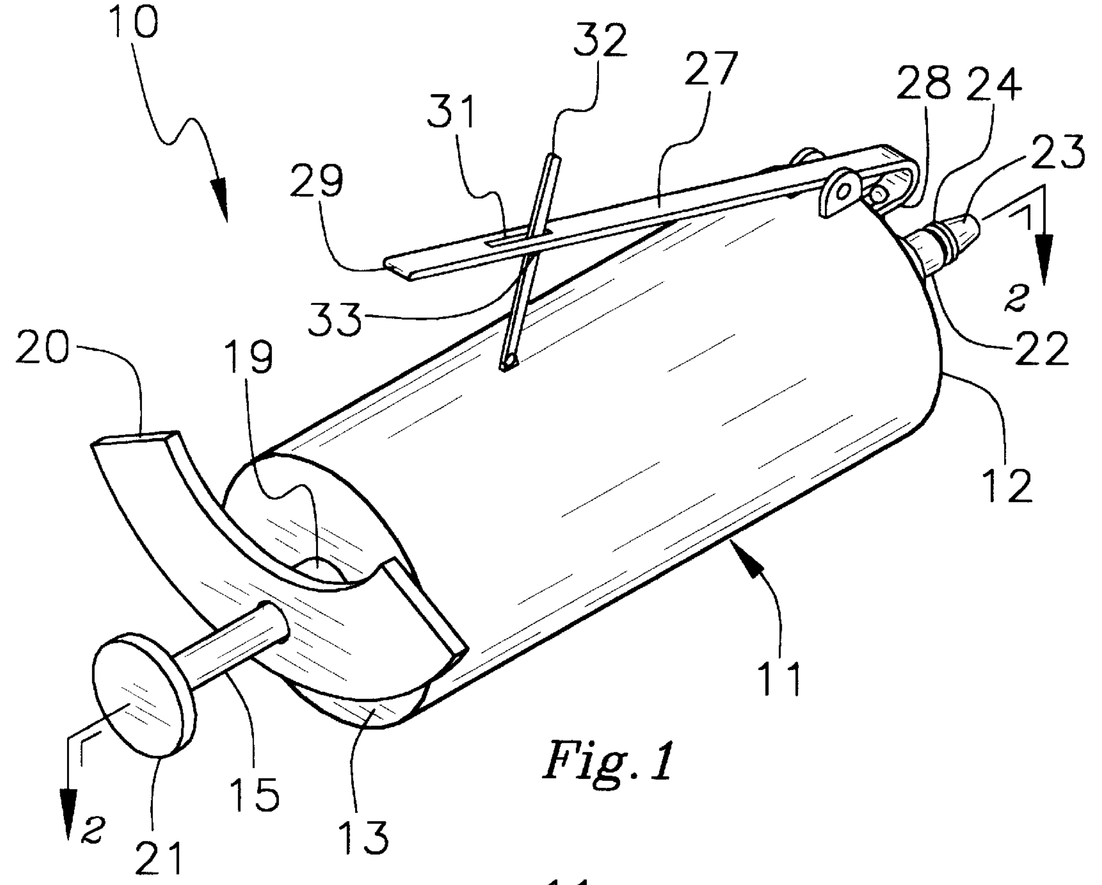
FIG. 1 is a schematic perspective view of a distal end region of a new brake caliper retracting tool according to the present invention.
Figure 2:
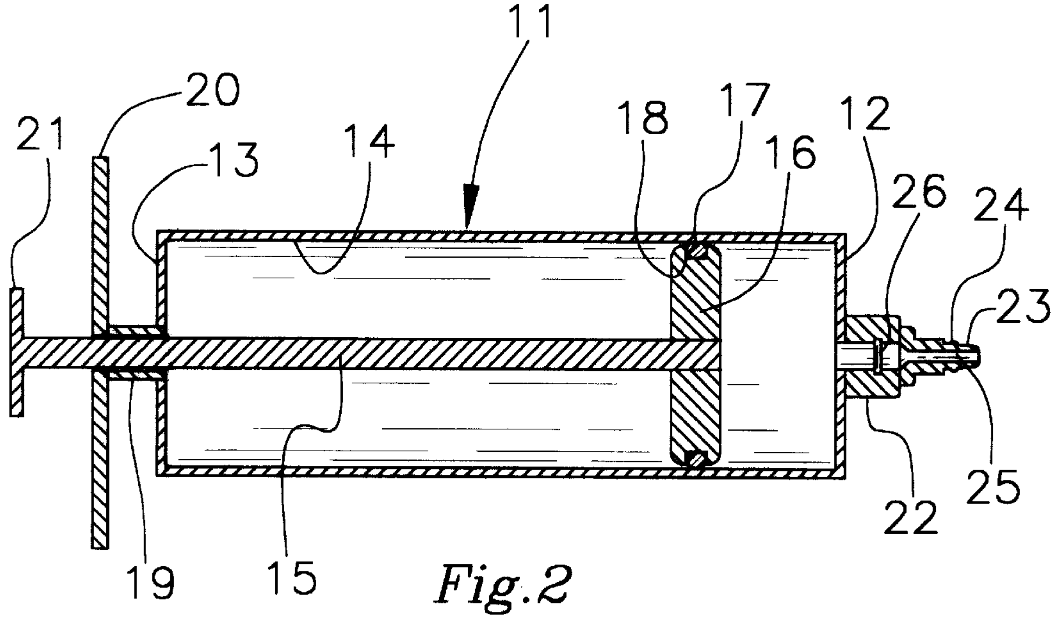
FIG. 2 is a schematic cross sectional view of the present invention taken from line 2—2 of FIG. 1.
Figure 3:
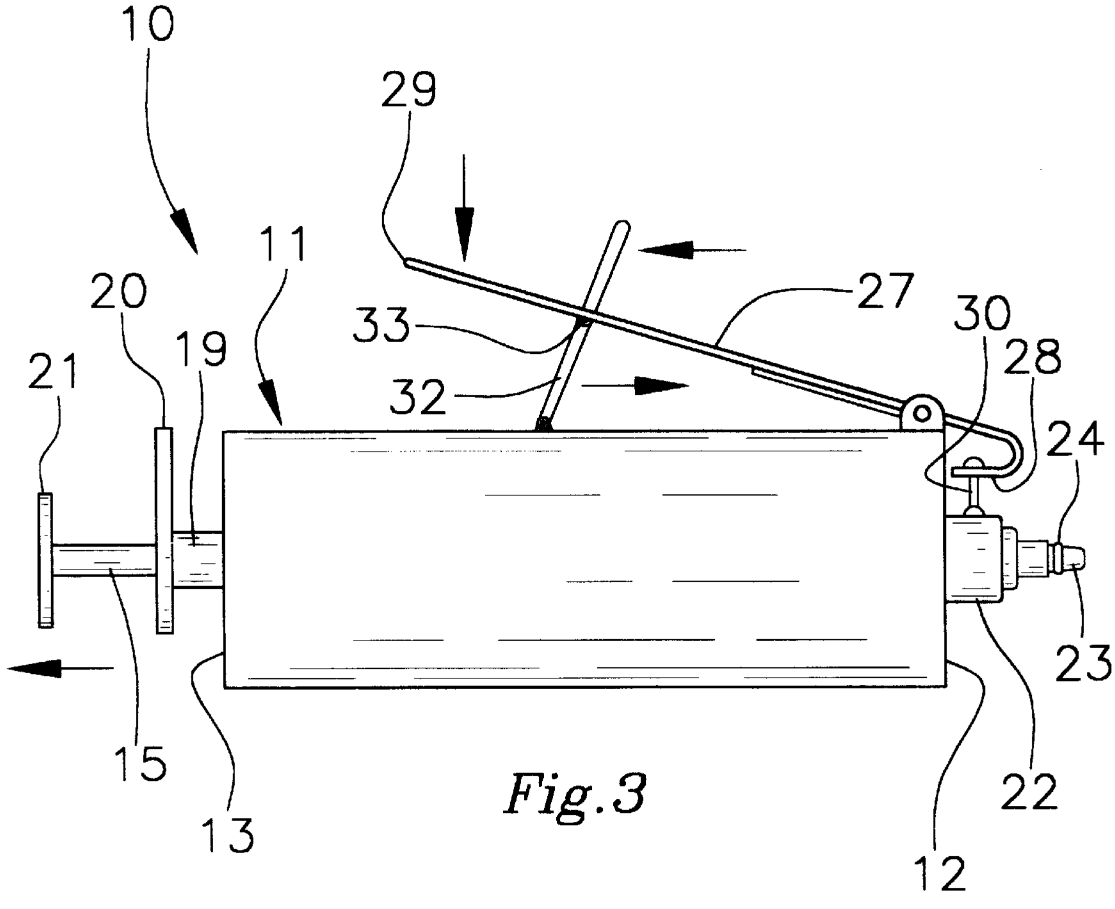
FIG. 3 is a schematic side view of the present invention.

With reference now to the drawings, and in particular to FIGS. 1 through 3 thereof, a new brake caliper retracting tool embodying the principles and concepts of the present invention and generally designated by the reference numeral 10 will be described.

As best illustrated in FIGS. 1 through 3, the brake caliper retracting tool 10 generally comprises a housing with proximal and distal ends, and an inner surface defining an interior cavity in the housing. An elongate shaft is slidably extended through the distal end of the housing into the interior cavity of the housing to permit slidable extension and retraction of the shaft in and out of the interior cavity of the housing. A plunger is disposed in the interior cavity of the housing and is coupled to a proximal end of the shaft. A backing plate is coupled to the distal end of the housing. A pushing plate is coupled to a distal end of the shaft. A passage extends through the proximal end of the housing and is designed for connecting to an air supply to permit passage therethrough of air into the interior cavity.

In use, the brake caliper retracting tool 10 is designed for pushing a caliper piston of a brake caliper into a piston housing of the brake caliper to widen a brake pad space of the caliper to permit installation of a brake pad into the brake pad space. Specifically, the tool 10 includes a housing 11 having proximal and distal ends 12,13, and an inner surface 14 defining an interior cavity in the housing. In one embodiment, the housing is generally cylindrical in shape and the proximal and distal ends of the housing are generally circular. In this embodiment, the interior cavity is also generally cylindrical in shape. This cylindrical shape of the housing helps a user maintain a comfortable grip when grasping the housing.

An elongate shaft 15 is slidably extended through the distal end of the housing into the interior cavity of the housing to permit slidable extension and retraction of the shaft in and out of the interior cavity of the housing. In one embodiment, the shaft may be coaxially aligned with the housing. The shaft has opposite proximal and distal ends. The proximal end of the shaft is located in the interior cavity of the housing. The distal end of the shaft is outwardly extended away from the distal end of the housing.

A plunger 16 is disposed in the interior cavity of the housing and is coupled to the proximal end of the shaft. In the one cylindrical embodiment described above, the plunger has a generally circular outer perimeter substantially coextensive with an inner circumference of the inner surface of the housing.

A resiliently deformable annular gasket 17 may be disposed around the outer perimeter of the plunger so that the annular gasket is interpose between the outer perimeter of the plunger and the inner circumference of the inner surface of the housing to provide a substantially air tight seal between the plunger and the inner surface of the housing. The outer perimeter of the plunger may also include an annular channel therearound. In such an embodiment, the annular gasket is disposed in the annular channel of the outer perimeter of the plunger.

The distal end of the housing may have a generally cylindrical tubular distal extent 19 outwardly extending therefrom around the shaft.

The distal extent of the distal end of the housing has a generally C-shaped backing plate 20 coupled thereto. The backing plate has a hole therethrough through which the shaft extends.

A pushing plate 21 is coupled to the distal end of the shaft. The pushing plate may be generally disk shaped and lying in plane substantially parallel to the distal end of the housing. The pushing plate may also have an outer diameter less than an outer diameter of the housing.

In use, the backing plate and the pushing plate are designed for insertion into a brake space of a brake caliper defined between a wall of the brake caliper and a piston of the brake caliper.

The proximal end of the housing has a proximal extent 22 outwardly extending therefrom. The proximal extent may be substantially coaxial with the housing. The proximal extent may have a connector nipple 23 outwardly extending therefrom. In use, the connector nipple is designed for inserting into a flexible hose fluidly connected to a compressed air supply. In a preferred embodiment, the connector nipple may have at least one annular ridge 24 therearound designed for helping hold the connector nipple in the hose.

A passage 25 extends through the proximal extent and the connector nipple into the interior cavity to permit fluid connection of the interior cavity with the hose connected to the connector nipple so that compressed air from the compressed air supply passes into the interior cavity. In use, the compressed air pushes the plunger toward the distal end and thereby extend the distal end of the shaft away from the distal end of the housing such that the pushing plate is moved outwardly away from the backing plate. The pushing plate then pushes against the piston of the caliper to force the piston into the piston housing to widen the brake space of the caliper to permit installation of a brake pad into the brake space of the caliper.

Optionally, a valve 26 may be included in the passage for selectively closing the passage. The valve is located in the proximal extent.

In such an embodiment, a lever 27 may be pivotally coupled to the housing adjacent the proximal end of the housing. The lever has opposite first and second ends 28,29. The first end of the lever has a pin 30 extending therefrom, the pin is coupled to the valve. In use, pivoting of the lever in a first direction causes the pin to pull the valve to an open position to permit passage of air through the passage. Conversely, pivoting of the lever in a second direction opposite the first direction causes the pin to push the valve to an closed position where the valve blocks the passage to close passage of air through the passage.

The lever may have a longitudinal slot 31 therethrough adjacent the second end of the lever. In such an embodiment, an elongate rod 32 with a pair of opposite ends is included. One of the ends of the rod is pivotally coupled to the housing. The rod is extended through the longitudinal slot of the lever such that the other of the ends of the rod extends from the lever. Preferably, the rod has a guide extent 33 slidably mounted to the lever in the longitudinal slot.

In use, the second end of the lever is designed for depressing to pivot in one of the directions towards the housing upon pushing with a finger of the user. The other end of the rod is designed for pivoting the lever in the other of the direction away from the housing upon pushing with a finger of the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool for pushing a caliper piston of a brake caliper into a piston housing of the brake caliper to widen a brake pad space of the caliper to permit installation of a brake pad into the brake pad space, said tool comprising:

a housing having proximal and distal ends, and an inner surface defining an interior cavity in said housing;

an elongate shaft being slidably extended through said distal end of said housing into said interior cavity of said housing to permit slidable extension and retraction of said shaft in and out of said interior cavity of said housing;

a plunger being disposed in said interior cavity of said housing and being coupled to a proximal end of said shaft;

a backing plate being coupled to said distal end of said housing;

a pushing plate being coupled to a distal end of said shaft;

a passage extending through said proximal end of said housing and being adapted for connecting to an air supply to permit passage therethrough of air into said interior cavity; and wherein said distal end of said housing has a tubular distal extent outwardly extending therefrom around said shaft, wherein said distal extent connects said backing plate to said distal end of said housing.

2. The tool of claim 1, wherein said housing is generally cylindrical in shape and said proximal and distal ends of said housing are generally circular, wherein said interior cavity is generally cylindrical in shape.

3. The tool of claim 1, wherein said shaft is coaxially aligned with said housing.

4. The tool of claim 1, wherein said plunger has an outer perimeter, wherein a resiliently deformable gasket is disposed around said outer perimeter of said plunger so that said annular gasket is interpose between said outer perimeter of said plunger and said inner surface of said housing to provide a substantially air tight seal between said plunger and said inner surface of said housing.

5. The tool of claim 4, wherein said outer perimeter of said plunger has a channel therearound, wherein said gasket is disposed in said channel of said outer perimeter of said plunger.

6. The tool of claim 1, wherein said proximal end of said housing has a proximal extent outwardly extending therefrom, wherein said proximal extent has a connector nipple outwardly extending therefrom, said connector nipple being adapted for inserting into a flexible hose fluidly connected to the air supply, wherein said passage extends through said proximal extent and said connector nipple.

7. The tool of claim 6, wherein said connector nipple having at least one annular ridge therearound adapted for helping hold said connector nipple in the hose.

8. The tool of claim 1, wherein a valve is provided in said passage for selectively closing said passage being provided in said proximal extent.

9. The tool of claim 8, wherein a lever is pivotally coupled to said housing adjacent said proximal end of said housing, wherein said lever has opposite first and second ends, said first end of said lever having a pin extending therefrom, said pin being coupled to said valve.

10. The tool of claim 9, wherein said lever has a longitudinal slot therethrough adjacent said second end of said lever, and wherein an elongate rod is pivotally coupled to said housing, said rod being extended through said longitudinal slot of said lever.

11. The tool of claim 10, wherein said rod has a guide extent slidably mounted to said lever in said longitudinal slot.

12. A tool for pushing a caliper piston of a brake caliper into a piston housing of the brake caliper to widen a brake pad space of the caliper to permit installation of a brake pad into the brake pad space, said tool comprising:

a housing having proximal and distal ends, and an inner surface defining an interior cavity in said housing;

wherein said housing is generally cylindrical in shape and said proximal and distal ends of said housing are generally circular, wherein said interior cavity is generally cylindrical in shape;

an elongate shaft being slidably extended through said distal end of said housing into said interior cavity of said housing to permit slidable extension and retraction of said shaft in and out of said interior cavity of said housing;

said shaft being coaxially aligned with said housing;

said shaft having opposite proximal and distal ends, said proximal end of said shaft being located in said interior cavity of said housing, said distal end of said shaft being outwardly extended away from said distal end of said housing;

a plunger being disposed in said interior cavity of said housing and being coupled to said proximal end of said shaft;

said plunger having a generally circular outer perimeter substantially coextensive with an inner circumference of said inner surface of said housing;

a resiliently deformable annular gasket being disposed around said outer perimeter of said plunger so that said annular gasket is interpose between said outer perimeter of said plunger and said inner circumference of said inner surface of said housing to provide a substantially air tight seal between said plunger and said inner surface of said housing;

said outer perimeter of said plunger having an annular channel therearound, said annular gasket being disposed in said annular channel of said outer perimeter of said plunger;

said distal end of said housing having a generally cylindrical tubular distal extent outwardly extending therefrom around said shaft;

said distal extent of said distal end of said housing having a generally C-shaped backing plate coupled thereto, said backing plate having a hole therethrough through which said shaft extends;

a pushing plate being coupled to said distal end of said shaft, said pushing plate being generally disk shaped and lying in plane substantially parallel to said distal end of said housing;

said backing plate and said pushing plate being adapted for insertion into a brake space of a brake caliper defined between a wall of the brake caliper and a piston of the brake caliper;

said proximal end of said housing having a proximal extent outwardly extending therefrom;

said proximal extent being substantially coaxial with said housing;

said proximal extent having a connector nipple outwardly extending therefrom, said connector nipple being adapted for inserting into a flexible hose fluidly connected to a compressed air supply;

said connector nipple having at least one annular ridge therearound adapted for helping hold said connector nipple in the hose;

a passage extending through said proximal extent and said connector nipple into said interior cavity to permit fluid connection of said interior cavity with the hose connected to the connector nipple so that compressed air from the compressed air supply passes into the interior cavity;

wherein the compressed air pushing said plunger toward said distal end and thereby extend said distal end of said shaft away from said distal end of said housing such that said pushing plate is moved outwardly away from said backing plate;

said pushing plate pushing against the piston of the caliper to force the piston into the piston housing to widen the brake space of the caliper to permit installation of a brake pad into the brake space of the caliper;

a valve for selectively closing said passage being provided in said proximal extent;

a lever being pivotally coupled to said housing adjacent said proximal end of said housing;

said lever having opposite first and second ends, said first end of said lever having a pin extending therefrom, said pin being coupled to said valve;

wherein pivoting of said lever in a first direction, said pin pulls said valve to an open position to permit passage of air through said passage;

wherein pivoting of said lever in a second direction opposite said first direction, said pin pushes said valve to an closed position where said valve blocks said passage to close passage of air through said passage;

said lever having a longitudinal slot therethrough adjacent said second end of said lever;

an elongate rod being pivotally coupled to said housing, said rod being extended through said longitudinal slot of said lever; and said rod having a guide extent slidably mounted to said lever in said longitudinal slot.

13. A tool for pushing a caliper piston of a brake caliper into a piston housing of the brake caliper to widen a brake pad space of the caliper to permit installation of a brake pad into the brake pad space, said tool comprising:

a housing having proximal and distal ends, and an inner surface defining an interior cavity in said housing;

an elongate shaft being slidably extended through said distal end of said housing into said interior cavity of said housing to permit slidable extension and retraction of said shaft in and out of said interior cavity of said housing;

a plunger being disposed in said interior cavity of said housing and being coupled to a proximal end of said shaft;

a backing plate being coupled to said distal end of said housing;

a pushing plate being coupled to a distal end of said shaft;

a passage extending through said proximal end of said housing and being adapted for connecting to an air supply to permit passage therethrough of air into said interior cavity;

wherein a valve is provided in said passage for selectively closing said passage being provided in said proximal extent;

wherein a lever is pivotally coupled to said housing adjacent said proximal end of said housing, wherein said lever has opposite first and second ends, said first end of said lever having a pin extending therefrom, said pin being coupled to said valve; and wherein said lever has a longitudinal slot therethrough adjacent said second end of said lever, and wherein an elongate rod is pivotally coupled to said housing, said rod being extended through said longitudinal slot of said lever.

14. The tool of claim 13, wherein said housing is generally cylindrical in shape and said proximal and distal ends of said housing are generally circular, wherein said interior cavity is generally cylindrical in shape.

15. The tool of claim 13, wherein said shaft is coaxially aligned with said housing.

16. The tool of claim 13, wherein said plunger has an outer perimeter, wherein a resiliently deformable gasket is disposed around said outer perimeter of said plunger so that said annular gasket is interpose between said outer perimeter of said plunger and said inner surface of said housing to provide a substantially air tight seal between said plunger and said inner surface of said housing.

17. The tool of claim 16, wherein said outer perimeter of said plunger has a channel therearound, wherein said gasket is disposed in said channel of said outer perimeter of said plunger.

18. The tool of claim 13, wherein said proximal end of said housing has a proximal extent outwardly extending therefrom, wherein said proximal extent has a connector nipple outwardly extending therefrom, said connector nipple being adapted for inserting into a flexible hose fluidly connected to the air supply, wherein said passage extends through said proximal extent and said connector nipple.

19. The tool of claim 18, wherein said connector nipple having at least one annular ridge therearound adapted for helping hold said connector nipple in the hose.

20. The tool of claim 13, wherein said rod has a guide extent slidably mounted to said lever in said longitudinal slot.

* * * * *